United States Patent

Namba et al.

[11] Patent Number: 4,467,760
[45] Date of Patent: Aug. 28, 1984

[54] INTERNAL COMBUSTION ENGINE

[75] Inventors: Yuzuru Namba; Kenichi Aoyagi, both of Hamamatsu, Japan

[73] Assignee: Suzuki Jidosha Kogyo Kabushiki Kaisha, Japan

[21] Appl. No.: 283,921

[22] Filed: Jul. 17, 1981

[30] Foreign Application Priority Data

Jul. 21, 1980 [JP] Japan .................................. 55-99724
Nov. 8, 1980 [JP] Japan ................................ 55-157319

[51] Int. Cl.³ .............................................. F02B 31/00
[52] U.S. Cl. .................................. 123/308; 123/52 MB
[58] Field of Search ................. 123/308, 432, 188 M, 123/52 MB

[56] References Cited

U.S. PATENT DOCUMENTS

| 4,132,197 | 1/1979 | Hanawa et al. | 123/308 |
| 4,133,322 | 1/1979 | Nakamura et al. | 123/308 |
| 4,167,161 | 9/1979 | Nakagami | 123/308 |
| 4,271,802 | 6/1981 | Hori et al. | 123/432 |

FOREIGN PATENT DOCUMENTS

0013807  2/1979  Japan .................................. 123/308

Primary Examiner—Craig R. Feinberg
Assistant Examiner—W. R. Wolfe
Attorney, Agent, or Firm—Quaintance & Murphy

[57] ABSTRACT

Internal combustion engine constituted such that two inlets are provided to a sub-suction path which is provided separately from the main suction path and serves to inject gas such as air or air-fuel mixture at high velocity in the peripheral direction of a combustion chamber at the suction stroke; one of said inlets is located upstream of the throttle valve, the other located in the air path of the carburetor at a position where the throttle valve can be shut in time of idling, wherein the effective opening area of the throttle valve can be enlarged through appropriate number and form of the inlets to be shut by the throttle valve and the downstream side inlet of the two inlets is set to be within the range of an angle, i.e., the downstream side inlet is located within the range of 60°–120° in terms of the angle which is made by the rotational axis of the throttle valve and an imaginary line which links the downstream side inlet and the center of the main suction path where the throttle valve is located.

13 Claims, 20 Drawing Figures

INTERNAL COMBUSTION ENGINE

BACKGROUND OF THE INVENTION

The present invention relates to an internal combustion engine equipped with a sub-suction path to generate a swirl of suction gas in the combustion chamber.

Lately, internal combustion engines for automobiles are increasingly required not only to have the exhaust gas purified but also to improve the rate of fuel consumption.

To meet this demand, EGR (exhaust gas recirculation) and lean burning are often practiced and thereby it is known that for the purpose of filling both requirements of much EGR and lean burning and avoiding both misfiring and fluctuations in burning, the speed of combustion has only to be elevated.

Recently several proposals have been made for the purpose of elevating the speed of combustion to provide a sub-suction path apart from the main suction path so that a gas can be injected via said sub-suction path into the combustion chamber, thereby generating a swirl of the suction gas in the combustion chamber.

However, engines equipped with such a sub-suction path are still in the stage of transition to the practical application with many of the problems left to be solved in future. One problem is associated with the gas injection from the sub-suction path; it is desirable that, depending on the engine working conditions, the volume of gas injection be controlled, namely, little gas injection in time of idling and much in urban operation involving much EGR (under light or medium load operation).

Such a requirement may be satisfied for instance by connecting a negative pressure type or electronic type flow control valve to the sub-suction path, but this would make the mechanism complicated and be expensive.

SUMMARY OF THE INVENTION

The primary object of the invention is to provide an internal combustion engine of extremely simple construction that can satisfy the above requirement through effective use of the throttle valve of the carburetor as it is, without use of an additional flow control valve.

Another object of the invention is to provide an internal combustion engine of extremely simple construction which can reliably satisfy the above requirement through such arrangement that two inlets of the sub-suction path are provided, one for exclusive use in idling (the first inlet) and the other for exclusive use under normal run (the second inlet); the second inlet can be opened or shut by the throttle valve of the carburetor; and much gas can be sucked in by selection of the number or shape of said second inlet.

Still another object of the invention is to provide an internal combustion engine with simple construction which can ensure sufficient lean burning and much EGR even in urban operation through such arrangement that for a sub-suction path, installed apart from the main suction path, which serves to inject gas such as air or air-fuel mixture at high velocity in the peripheral direction of the combustion chamber at suction stroke, two inlets are provided, one of them located at the upstream side of the throttle valve and the other located in the air path of the carburetor at such a position that it can be shut in time of idling by means of the throttle valve; and the downstream side inlet of the two inlets is set to be within the range of an angle, i.e., the downstream side inlet is located within the range of 60°-120° in terms of the angle which is made by the rotational axis of the throttle valve and an imaginary line which links the downstream side inlet and the center of the main suction path where the throttle valve is located, thereby controlling the gas injection depending on the engine working conditions.

BRIEF DESCRIPTION OF THE DRAWINGS

FIGS. 7 to 10 are aids to understanding the present invention, FIG. 7 being a section view of a part matching FIG. 2; FIG. 9 being a section view of a part matching FIG. 3.

FIGS. 18 to 20 show still another embodiment of the present invention, FIG. 18 being a detailed section view of the carburetor; FIG. 19 being a section view at IX—IX of FIG. 8.

DETAILED DESCRIPTION OF THE INVENTION

Figure 1:
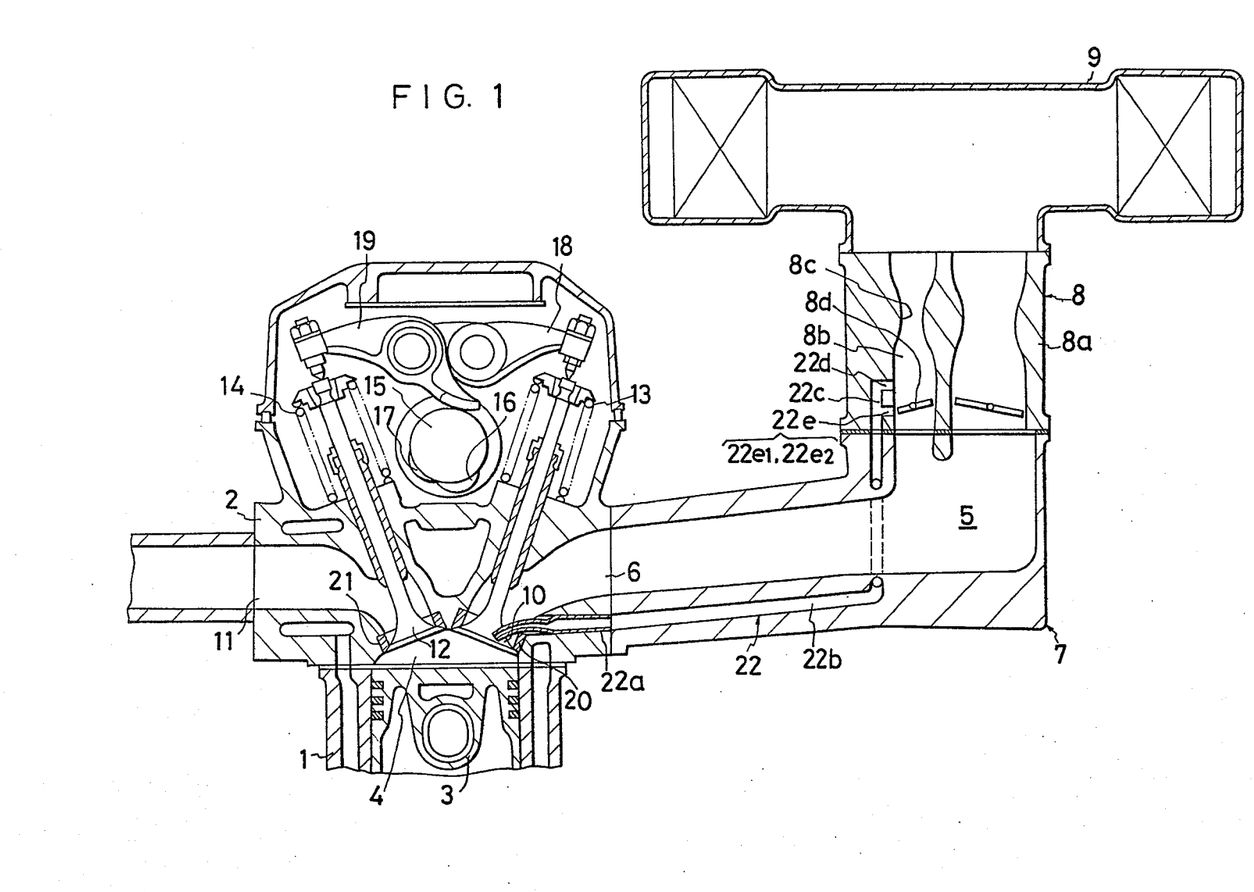
FIG. 1 is a total section view of one embodiment of the present invention.
Figure 2:
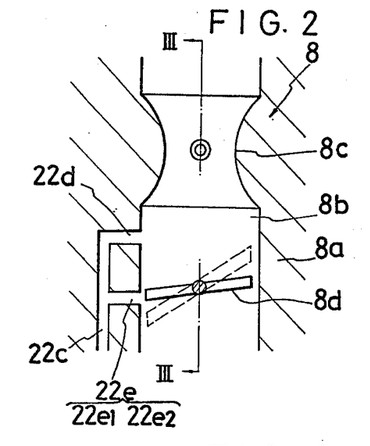
FIG. 2 is a detailed section view of the present invention.

One embodiment of the present invention is described here referring to the attached drawings. In FIG. 1, 1 is a cylinder; 2 is a cylinder head; 3 is a piston; and 4 is a combustion chamber. A main suction path 5 opens in said combustion chamber 4. The main suction path 5 is constituted as a passage originating from a suction port 6 formed in the cylinder head 2, and a suction manifold 7 and leading via a two-barrel carburetor 8 which is a fuel supplying device, to an air cleaner 9.

At the outlet from the suction port 6, i.e., at the inlet to the combustion chamber 4, there is provided a suction valve 10, which opens or shuts the suction port 6.

Meanwhile, an exhaust port 11 formed in the cylinder head 2 can be opened or shut by an exhaust valve 12. Said two valves 10,12 are controlled by a control device consisting of return springs 13,14; cams 16,17 driven by a camshaft 15; and rocker-arms 18,19; when shut, these valves sit on valve seats 20,21.

Figure 3:
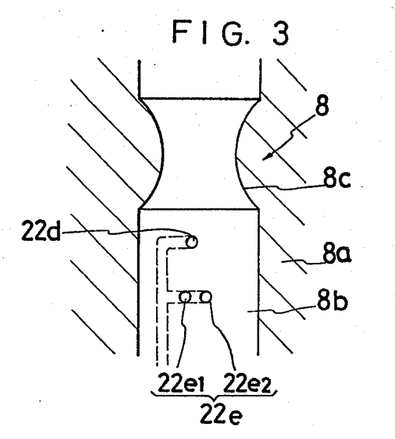
FIG. 3 shows a section at III—III of FIG. 2.

Reference numeral 22 is a sub-suction path having an effective opening area less wide than that of the main suction path 5. Said sub-suction path comprises an injection nozzle pipe 22a pressed into the cylinder head 2, a passage 22b formed in the suction manifold 7, and a passage 22c formed in the body 8a of the carburetor 8. As indicated in FIG. 3, said passage 22c communicates to two inlets 22d,22e respectively located in the primary air path 8b of the carburetor 8.

Of the two inlets 22d,22e, the latter 22e alone is plural (in this example, two, i.e., $22e_1$ and $22e_2$); they are spaced in the flow direction of said path 8b, the first one 22d located upstream at a position between the primary venturi 8c and the primary throttle valve 8d of the carburetor 8, namely, bypassing only the throttle valve 8d and communicating normally to the atmosphere just upstream of said valve 8d. Meanwhile the second inlets 22e located downstream, i.e., $22e_1$ and $22e_2$ are opened or shut by the throttle valve 8d and are positioned such that they are shut by said throttle valve 8d at idling. Said inlets $22e_1,22e_2$ are spaced around the throttle valve 8d at idling position.

It is designed such that the exhaust gas can be recirculated via the EGR valve into the main suction path 5 or the sub-suction path 22 from the exhaust system. The constitution of the EGR path and the EGR valve, being the same as in the conventional design, is not shown here.

In such constitution of the internal combustion engine, at the suction stroke at which the suction valve 10 is open, the air-fuel mixture is supplied to the combustion chamber 4 from the main suction path 5, while out of the sub-suction path 22 the gas is sucked and injected. Gas injection from said sub-suction path 22 causes the air-fuel mixture sucked into the combustion chamber 4 to generate a swirl around the axis of the cylinder 1, thereby increasing the speed of combustion.

Figure 4:
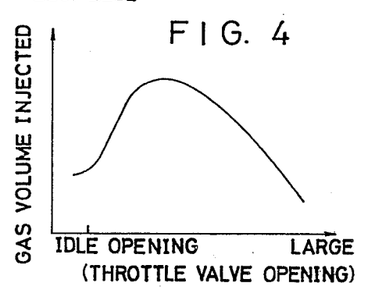
FIG. 4 is a characteristic diagram illustrating the effect of the present invention.
Figure 5:
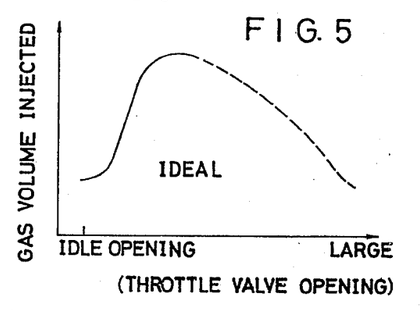
FIG. 5 is a characteristic diagram illustrating an ideal volume of gas injection from the sub-suction path.

Thereby since at idling the second inlets $22e(22e_1,22e_2)$ are closed by the throttle valve 8d, a relatively small volume of the gas is sucked into the sub-suction path 22 through the first inlet 22d alone. As the throttle valve 8d opens, the sub-suction path 22 sucks the gas out of the first inlet 22d as well as the gas from the second inlets $22e(22e_1,22e_2)$. Such gas suction into the sub-suction path 22, i.e., the gas injection into the combustion chamber 4 from the sub-suction path depends on the opening degree of the throttle valve 8d, as indicated in FIG. 4. FIG. 5 is a diagram illustrating an ideal volume of gas injection from the sub-suction path and FIG. 4, which schematically indicates the effect of the present invention, is extremely close to FIG. 5. It goes without saying that at idling the opening area of the first inlet 22d is set such as to give an ideal volume of gas injection from the sub-suction path 22.

Figure 6:
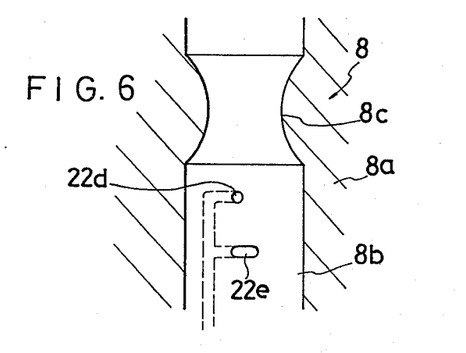
FIG. 6 is a section view, matching FIG. 3, of another embodiment of the present invention.

FIG. 6 illustrates another embodiment of the present invention, in which instead of providing plural inlets, $22e_1$ and $22e_2$, the inlet 22e is designed in a slender form following the profile of the throttle valve 8d so that the net effective opening area can be enlarged; even in this case the characteristic curve such as illustrated in FIG. 5 will be obtained.

Figure 7:
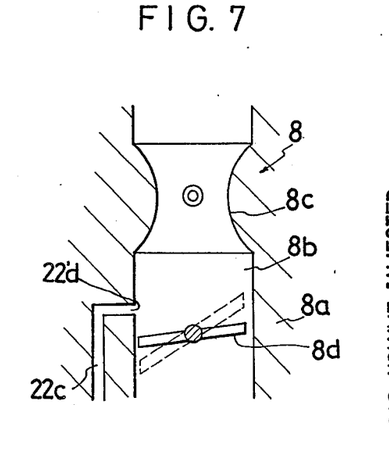
Figure 9:
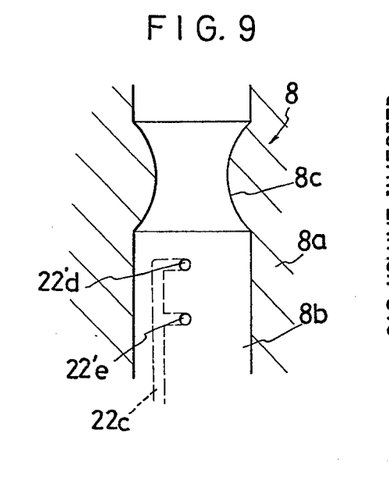

FIGS. 7 and 9 are aids to understanding the present invention, which illustrate a different design of the inlet to the sub-suction path 22 from the present invention, FIG. 7 being a case of only the first inlet $22'd$ being provided; and FIG. 9 being a case of inlets being two, i.e., $22'd$ and $22'e$, the latter being circular in section (circular section is standard for convenience of fabrication) and only one.

Figure 8:
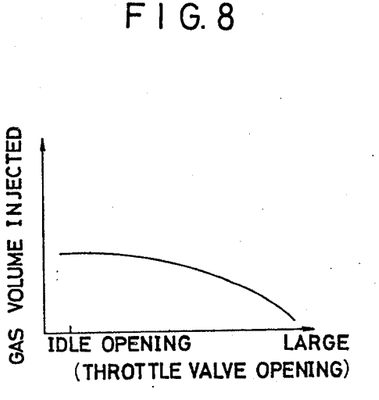
FIG. 8 being a characteristic diagram matching FIG. 7.
Figure 10:
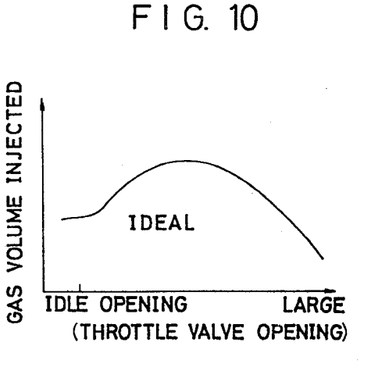
FIG. 10 being a characteristic diagram matching FIG. 9.

In the case of FIG. 7 the gas injection from the sub-suction path will be as indicated in FIG. 8, while in the case of FIG. 9, it will be as indicated in FIG. 10. As understood from FIG. 8, in the case of FIG. 7 the gas injection in urban operation is substantially little, and if the opening area of the first inlet $22'd$ is adapted to the urban operation, the gas injection will turn out excessive at idling.

As seen from FIG. 10, in the case of FIG. 9 an ideal volume of gas injection can be obtained, but the gas injection for urban operation is still insufficient.

As understood from the supplemental description in FIGS. 7 to 10, the reason to have such a constitution that a number of the second inlets $22'e$ are spaced around the throttle valve 8d at idling or these inlets $22'e$ are elongated is that said second inlets 22e may be closed by the throttle valve 8d at idling, while for urban operation the net effective opening area of said second inlets 22e may be enlarged. Thus in the case of FIG. 9, if the diameter of the second inlet $22'e$ is made large to enlarge its opening area, it will be impossible to close said second inlet $22'e$ at idling by means of the throttle valve 8d.

As evident from the above, in the embodiment illustrated in FIGS. 1 to 6, the gas injection from the sub-suction path can be ideally adapted to the engine working conditions by an extremely simple construction.

FIGS. 11 to 20 illustrate another embodiment of the present invention, in which two inlets are provided to the sub-suction path, separately installed from the main suction path, which serves to inject at high velocity the air or air-fuel mixture in the peripheral direction of the combustion chamber at the suction stroke, one of said inlets being located at the upstream side of the throttle valve and the other located in the air path of the carburetor at a position where it can be closed by the throttle valve at idling; and the downstream side inlet of the two inlets is set to be within the range of an angle, i.e., the downstream side inlet is located within the range of 60°–120° in terms of the angle which is made by the rotational axis of the throttle valve and an imaginary line which links the downstream side inlet and the center of the main suction path where the throttle valve is located, whereby the gas injection can be adapted to the engine working conditions and thus satisfactory lean burning and much EGR can be secured even in urban operation by a simple construction of the engine.

Referring to FIGS. 11 to 20, this embodiment is to be described here.

Figure 11:
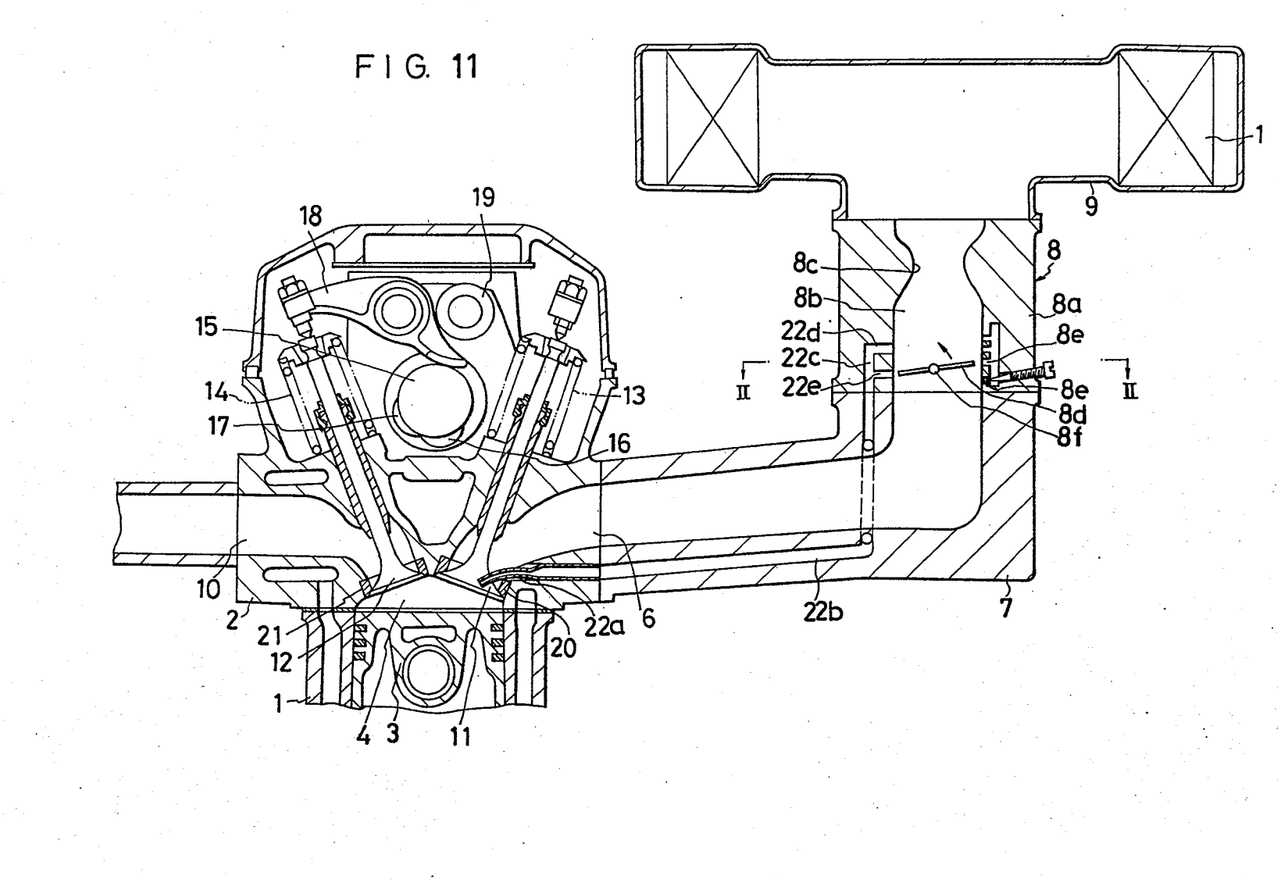
FIG. 11 is a section view of one embodiment of the present invention as a whole.

In FIG. 11, 1 is a cylinder; 2 is a cylinder head; 3 is a piston; 4 is a combustion chamber, into which a main suction path 5 opens.

The main suction path 5 is a passage leading to an air cleaner 9 via a suction port 6 formed in the cylinder head 2, a suction manifold 7 and a cylinder bore carburetor 8.

The suction port 6 is designed in a direction of generating a swirl in the combustion chamber 4, namely, in such a tangential direction to the combustion chamber 4 that the volume efficiency may not drop under high load. And the swirling direction is set such that the air-fuel mixture supplied from said suction port 6 may flow into an exhaust port 10 after sweeping past the spark plug not shown here. The opening and closing of said two ports 6,10 are done by means of a suction valve 11 and an exhaust valve 12, both of which are controlled by a control device consisting of return springs 13,14, cams 16,17 driven by a cam shaft 15 and rocker arms 18,19. At closing, said valves sit on valve seats 20,21.

Reference numeral 22 is the sub-suction path having a smaller effective opening area than that of the main suction path 5. Said sub-suction path consists of an injection nozzle 22a which is buried in the cylinder head 2 and constitutes an outlet of said cylinder head, a passage 22b formed in the suction manifold 7; a passage 22c formed in the body 8a of the carburetor 8; and two inlets 22d,22e branching from said passage 22c and located in an air path 8b of the carburetor 8. Said injection nozzle 22a opens just at the upstream side of the suction valve 11; when the suction valve 11 is open, said nozzle 22a directs itself into the combustion chamber 4 through the gap between said valve 11 and a valve seat 20, the direction being tangential to the combustion chamber 4, i.e., such that a swirl may be generated in the combustion chamber 4.

Naturally, this swirling direction agrees with the swirling direction due to the suction port 6.

Said two inlets 22d,22e of the sub-suction path 22 are spaced from each other in the flow direction of the air path 8b; and the inlet 22d at the upstream side (hereinafter referred to as "upstream side inlet") comes between a venturi 8c of the carburetor 8 and a throttle valve 8d. Meanwhile the inlet 22e at the downstream side (hereinafter referred to as "downstream side inlet") is located in the vicinity of the tip of one wing of the butterfly type throttle valve 8d at closing position, while slow-port 8e . . . of the carburetor 8 opens in the vicinity of the tip of the other wing of said throttle valve 8d. Thus, when the throttle valve 8d is at closing position, the downstream side inlet 22e is closed by said throttle valve 8d; and as seen from the relationship with the opening position of the port 8e . . . , the effective opening area steadily increases as said throttle valve 8d turns in the opening direction (in the counterclockwise direction in FIG. 11) around a shift 8f, whereby such a relationship of location is formed that said inlet 22e is located farther upstream in the air path 8b than the tip of said throttle valve 8d.

Figure 12:
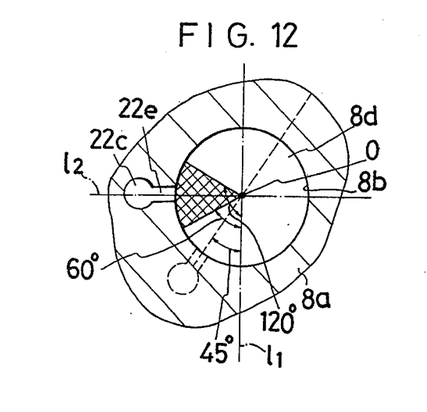
FIG. 12 is a detailed section view at II—II of FIG. 11, illustrating the positional relationship between the throttle valve and the inlet to the sub-suction path.

Further, the downstream side inlet 22e is located as indicated in FIG. 12, relative to the throttle valve 8d. Namely, putting the rotational axis (axis of the shaft 8f) of the throttle valve 8d as $l_1$, the axial center (bore center) of the path 8b as O, and the line linking the inlet 22e to said axial center O as $l_2$, the inlet 22e is located at an angle in the shaded area of FIG. 12, i.e., in the range of 60°-120° in terms of the angle $\theta$ between $l_1$ and $l_2$. The effect of such a location will be described later.

The center-to-center distance between said two inlets 22d and 22e is preferably taken as follows. As illustrated in FIG. 4, putting the diameter of the downstream side inlet 22e as D and the center-to-center distance between the two inlets 22d and 22e as L, the desirable relation will be L≧2D; the effect of such a relation will be described later.

Next, the function of the above constitution is to be described. First, at engine idling (no load) of the engine, the throttle valve 8d is closed and thereby the downstream side inlet 22e of the sub-suction path 22 is closed. In this condition, the air-fuel mixture is supplied from the main suction path 5 via the slow-port 8e into the combustion chamber 4. Simultaneously with this supply of the air-fuel mixture, the air, which has been metered through the venturi 8c, is sucked through the upstream side inlet 22d of the sub-suction path 22 into said sub-suction path 22 and injected through the nozzle 22a into the combustion chamber 4. Injection of this air causes a swirl to be generated in the combustion chamber 4, thereby making the air-fuel mixture uniform, increasing the flame spreading velocity and thus stabilizing the combustion. Since this air injection is done using a differential pressure between the negative pressure in the combustion chamber 4 and the near-atmospheric pressure upstream of the throttle valve 8d, said air injection, i.e., the generated swirl is intensified, thereby ensuring satisfactory stability of combustion even in the presence of lean air-fuel mixture and much EGR. Of course, said air injection is timed to the opening and closing of the suction valve 11.

Under low to medium load such as in urban operation, the downstream side inlet 22e opens depending on the opening degree of the throttle valve 8d and accordingly the volume of air sucked into the sub-suction path 22 (air-fuel mixture in the main system of the carburetor according to the opening degree of the throttle valve 8d) increases, thereby stabilizing the combustion as well as in the above case.

Figure 13:
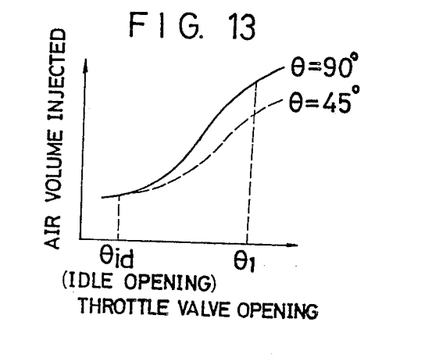
FIGS. 13 and 15 schematically illustrate the effect of the present invention.
Figure 14:
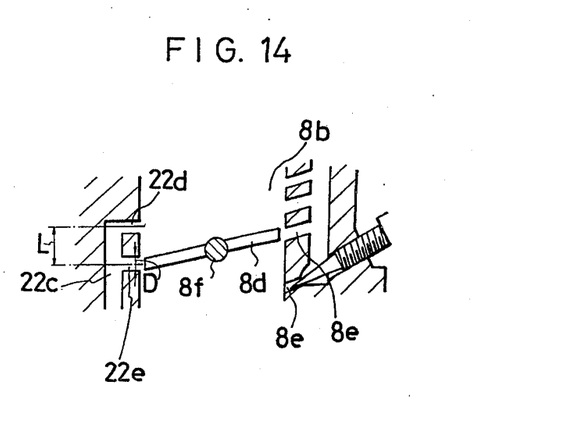
FIG. 14 is a detailed section view of FIG. 11.

The positional relation between the throttle valve 8d and the downstream side inlet 22e being such as described above, a sufficient air injection can be obtained matching the opening degree of the throttle valve 8d, which is favorable for stable combustion. As apparent from FIG. 13, this is more favorable for increased air injection than when the downstream side inlet 22e is set at 45° as illustrated by a broken line of FIG. 12. FIG. 13 shows a case of the downstream side inlet 22e being set at 90°, but a setting of the angle in 60°-120° will produce approximately the same effect. In FIG. 13, $\theta$, denotes an opening degree of the throttle valve 8d equivalent to R-L 40 km/h torque.

Figure 15:
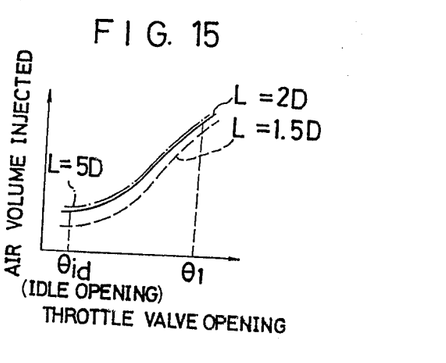

As evident from FIG. 15, the above spacing of the two inlets 22d and 22e is found favorable for increasing the air suction into the sub-suction path 22. Namely, by putting L≧2D, the influence of the negative pressure in the combustion chamber 4 on the upstream side inlet 22d can be reduced.

Figure 16:
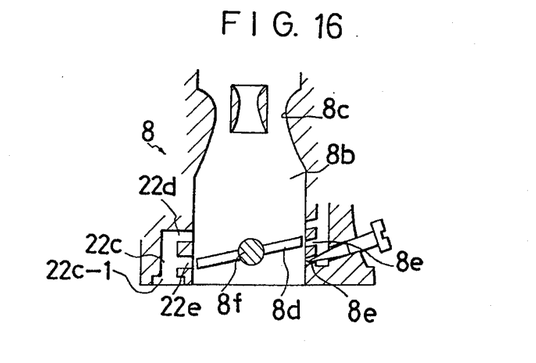
FIGS. 16 and 17 show another embodiment of the present invention, FIG. 16 being a detailed section view of the carburetor and FIG. 17 being a view of the end face of the carburetor to which side the suction manifold is connected.
Figure 17:
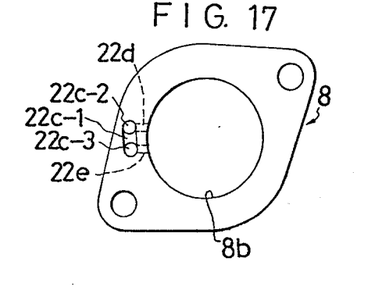

FIGS. 16,17 illustrate a case of the sub-suction path 22 being formed, particularly the constitution around the two inlets 22d,22e. In the present embodiment, in which the suction manifold 7 (in its wall) constitutes a part of the sub-suction path 22, the passage 22c, which constitutes a part of the sub-suction path 22, is opened at the end face of the carburetor 8 to which side the suction manifold 7 is connected. Said passage 22c runs parallel to the air path 8b of the carburetor and its opening end is designed as a long slot portion (denoted by 22c-1) extending in the peripheral direction of the air path 8b. Such designing of the opening end of the passage 22c as a long slot portion 22c-1 assures communication of the passages 22c,22b, even if the axial center of an opening end of the passage 22b, corresponding to the passage 22c, formed in the suction manifold 7 at the side of the carburetor 8 happens to be more or less staggered to the axial center of the passage 22c. Even in the case of the passage 22c being divided into two, exclusive one for the upstream side inlet 22d (denoted by 22c-2 in FIG. 17) and exclusive one for the downstream inlet 22e (22c-3 in FIG. 17), the long slot portion 22c-1 will assure communication of 22c-2 and 22c-3.

Figure 18:
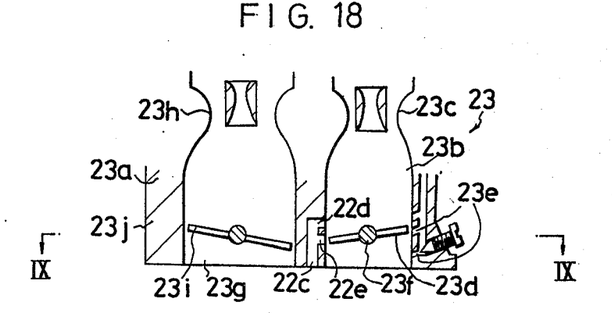
Figure 19:
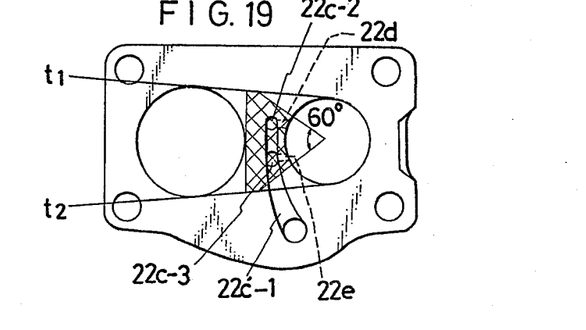
Figure 20:
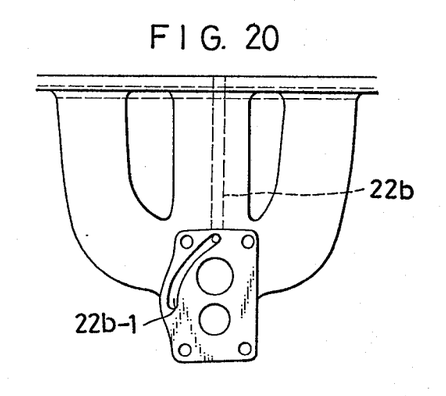
FIG. 20 being a plan view of the suction manifold as seen from the carburetor connection side.

FIGS. 18 to 20 illustrate a case of the carburetor being a two-barrel carburetor 23. In these figures, 23a is a main body; 23b is the primary air path; 23c is the primary venturi; 23d is the primary throttle valve; 23e is a slow-port; 23f is a rotational shaft of the primary throttle valve 23d; 23g is the secondary air path; 23h is the secondary venturi; and 23i is the secondary throttle valve. In the present example, the two inlets 22d,22e of the sub-suction path 22 are respectively located in the primary air path 23b such that they find themselves relative to the throttle valve 23d at positions indicated in FIGS. 11,12 and 14. Meanwhile the passage 22c is divided into the ones 22c-2 and 22c-3 exclusive for the inlets 22d and 22e, respectively; 22c-2 and 22c-3 are respectively located on the partition wall dividing the air paths 23h and 23g. A long slot portion 22c'-1 is formed at the end face of the carburetor to which side the suction manifold 7 is connected so that said passages 22c-2 and 22c-3 can communicate with the passage 22b, at a point beyond the common contacts $t_1,t_2$ of the air paths 23b,23h; and similarly a long slot portion 22b-1 is formed also at the end face of the suction manifold 7 to which side the carburetor 23 is connected, so as to correspond to the long slot portion 22c'-1.

The part to house the carburetor 23 and the throttle valves 23d,23i is designed as a separate block 23j; otherwise, a long slot portion 22c'-1 may be formed on the upstream side surface of said block 23j so that a passage can be extended therefrom to the injection nozzle 22a.

Further the arrangement may be such that the carburetor block is composed of a venturi side one and a throttle valve side one; a long slot portion extending in the peripheral direction of the air path of the carburetor is formed at the end face of the venturi side block to which side the throttle side block is connected; and the carburetor paths comprising said upstream side and downstream side inlets and respectively constituting a part of said sub-suction path open into said long slot. Also the arrangement may be such that at the carburetor side end of the suction manifold, a long slot directed to the periphery of the air path of the carburetor is formed; and the carburetor paths respectively having an upstream side inlet and a downstream side inlet and respectively constituting a part of said sub-suction path open into said long slot.

As apparent from the above description, the present invention as illustrated in the examples of FIGS. 11 to 20 exhibits various effects as follows:

(1) Since the gas injection from the sub-suction path is controlled by the suction valve for opening and closing the main suction path, there is no need for an additional valve for opening and closing the sub-suction path. Accordingly the construction can be extremely simplified.

(2) Since the air introduced through the upstream side inlet of the sub-suction path is injected into the combustion chamber when the throttle valve is at closing position, stable combustion due to air injection can be secured even at idling. Of course, the air is sucked at the upstream side inlet after passing through the gauge (in this case, the venturi) to measure the air volume introduced in the main suction path; and therefore the control of mixing ratio is easy.

(3) By opening the downstream side inlet of the sub-suction path within the range in which $\theta$ is 60°-120°, this downstream side inlet is controlled in closing and opening by a portion, which has relatively large rotative displacement, of the peripheral portion of the throttle valve. Therefore, when volume of gas sucked in a case where the downstream side inlet is set at the above-mentioned position and that in a case where the downstream side inlet is set at a portion except the above-mentioned range are compared in a state that the opening degree of the throttle valve is same, control of opening and closing is greater in the former case (present invention) than in the latter case. As a result, the former case can suck in much more gas, whereby stable combustion can be very effectively conducted.

What is claimed is:

1. An internal combustion engine comprising:
  A. a carburetor for supplying fuel to a combustion chamber; said carburetor having:
    (1) an air path equipped with a venturi; and
    (2) a throttle valve capable of being placed in an idling position and in a non-idling position; said throttle valve having a perhipheral face; and
  B. a combustion chamber for receiving fuel from the carburetor; and
  C. a main suction path connecting the carburetor to the combustion chamber wherein said main suction path is adapted to be opened and closed by a suction valve; and
  D. a sub-suction path separate from the main suction path wherein the sub-suction path has an outlet directed toward the combustion chamber so that a swirl of suction gas is generated in the combustion chamber during a suction stroke; wherein the sub-suction path has at least two inlets, namely:
    (1) a first inlet which bypasses the throttle valve of the carburetor and opens into the atmosphere; and
    (2) a second inlet located in the air path of the carburetor so that the second inlet can be opened and closed by the throttle valve; and
    (3) wherein closing of the second inlet is accomplished by the throttle valve at idling position; and
    (4) wherein the second inlet has a wide effective opening area facing the peripheral face of the throttle valve when the throttle valve is at its idling position,
    (5) wherein the second inlet is elongated around the peripheral face of the throttle valve at idling position, thereby enlarging the effective opening area of said second inlet.

2. An internal combustion engine comprising:
  A. a carburetor for supplying fuel to a combustion chamber; said carburetor having:
    (1) an air path equipped with a venturi; and
    (2) a throttle valve capable of being placed in an idling position and in a non-idling position; said throttle valve having a peripheral face; and
  B. a combustion chamber for receiving fuel from the carburetor; and
  C. a main suction path connecting the carburetor to the combustion chamber wherein said main suction path is adapted to be opened and closed by a suction valve; and
  D. a sub-suction path separate from the main suction path wherein the sub-suction path has an outlet directed toward the combustion chamber so that a swirl of suction gas is generated in the combustion chamber during a suction stroke; wherein the sub-suction path has at least two inlets, namely:
    (1) a first inlet which bypasses the throttle valve of the carburetor and opens into the atmosphere; and (2) a second inlet located in the air path of the carburetor so that the second inlet can be opened and closed by the throttle valve; and (3) wherein closing of the second inlet is accomplished by the throttle valve at idling position; and (4) wherein the second inlet has a wide effective opening area facing the peripheral face of the throttle valve when the throttle valve is at its idling position, (5) wherein the second inlet constitutes a plurality of openings around the peripheral face of the throttle valve at idling position, thereby enlarging the effective opening area of said second inlet.

3. Internal combustion engine of claim 2, wherein the carburetor is a two-barrel carburetor equipped with a primary air path and a secondary air path, a primary throttle valve, and a secondary throttle valve, a primary venturi and a secondary venturi; where the second inlet is located in the primary air path of a two-barrel carburetor.

4. Internal combustion engine of claim 3, wherein the first inlet is located between the primary throttle valve and the primary venturi.

5. Internal combustion engine of claim 3, wherein the first inlet is located upstream of the carburetor venturi.

6. An internal combustion engine comprising:
A. a carburetor for supplying an air-fuel mixture to a combustion chamber; said carburetor comprising a throttle valve to control a volume of air-fuel mixture; said throttle valve being rotatable about its rotational axis; said throttle valve having a peripheral face; and
B. a combustion chamber for receiving the air-fuel mixture from the carburetor; and
C. a main suction path connecting the carburetor to the combustion chamber; said main suction path adapted to be opened and closed by a suction valve; and
D. a sub-suction path having an outlet located just upstream of the suction valve for opening and closing the main suction path, wherein two inlets are spaced from each other at an upstream side and at a downstream side of said sub-suction path, thereby being termed an upstream side inlet and a downstream side inlet; said upstream side inlet of said sub-suction path is located downstream of a gauge to measure an air volume introduced into said main suction path; said downstream side inlet is located near the peripheral face of the throttle valve at its closed position when said throttle valve turns in an opening direction, said downstream side inlet comes upstream of the peripheral face of said throttle valve; and an opening position of the downstream side inlet is set to be within a range of an angle, i.e., the downstream side inlet is located within the range of 60° to 120° in terms of the angle which is made by the rotational axis of the throttle valve and an imaginary line which links the downstream side inlet and the center of the main suction path in the carburetor at the point where the throttle valve is located, wherein the downstream side inlet constitutes a plurality of openings around the peripheral face of the throttle valve at idling position, thereby enlarging the effective opening area of said downstream side inlet.

7. Internal combustion engine of claim 6, wherein the carburetor is a two-barrel carburetor having a primary air path and a secondary air path; and wherein the upstream side and downstream side inlets of the sub-suction path are located in the primary air path of the carburetor.

8. Internal combustion engine of claim 7, wherein at a partition wall dividing the primary and the secondary air paths of the carburetor, separate paths respectively having upstream and downstream inlets are formed constituting a part of the sub-suction path; said two paths communicate with a long slot formed at an end face of the carburetor to which side a suction manifold is connected; at an end face of the suction manifold to which side the carburetor is connected, a second long slot opening into said long slot is formed; and into said second long slot at the end face of the suction manifold, a path formed in the suction manifold and constituting a part of the sub-suction path opens.

9. Internal combustion engine of claim 6, wherein the center-to-center distance of said two inlets of the sub-suction path is over two times the diameter of the downstream side inlet.

10. Internal combustion engine of claim 6 or 9, wherein a part of the sub-suction path is formed within a suction manifold and at least one end of said sub-suction path is located at an end face of the suction manifold to which side the carburetor is connected; a long slot which extends in the peripheral direction of an air path of the carburetor and to which said part of the sub-suction path opens, is formed at an end face of the carburetor to which side the suction manifold is connected; and separate paths of the carburetor having respectively an upstream side inlet and a downstream side inlet and respectively constituting a part of said sub-suction path open into said long slot.

11. Internal combustion engine of claim 6 or 9, wherein two blocks of the carburetor are provided, a venturi side block and a throttle valve side block; at an end face of the throttle valve side block to which side the venturi side block is connected, a long slot is formed extending in the peripheral direction of an air path of the carburetor; and separate paths of the carburetor having respectively upstream side and downstream side inlets and respectively constituting a part of the sub-suction path open into said long slot.

12. Internal combustion engine of claim 6 or 9, wherein a long slot is formed extending in the peripheral direction of an air path of the carburetor at an end face of a suction manifold to which side the carburetor having respectively upstream side and downstream side inlets and respectively constituting a part of the sub-suction path open into said long slot.

13. Internal combustion engine of claim 6 or 9, wherein two carburetor blocks are provided, a venturi side block and a throttle valve side block; at an end face of the venturi side block to which side the throttle side block is connected, a long slot is formed extending in the peripheral rotating direction of an air path of the carburetor; and separate paths of the carburetor having respectively upstream side and downstream side inlets and respectively constituting a part of the sub-suction path open into said long slot.

* * * * *